Patented Oct. 18, 1927.

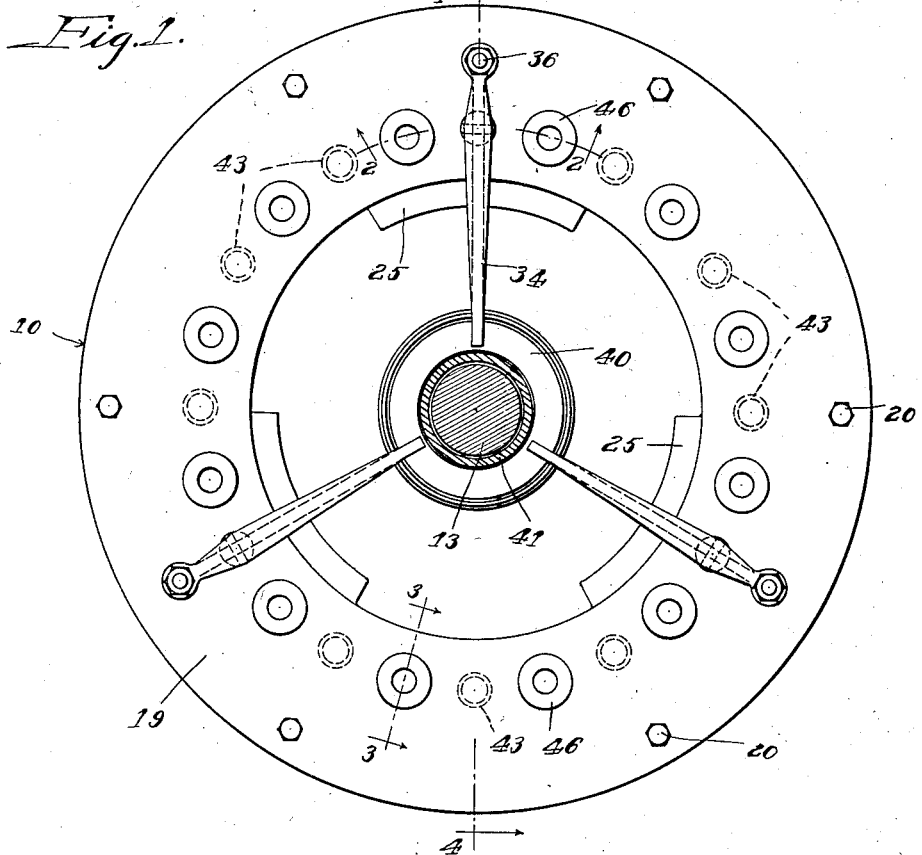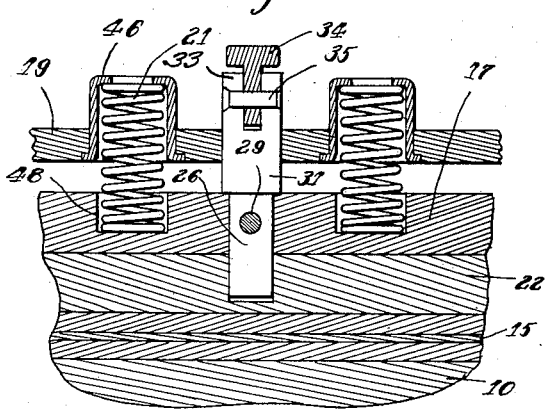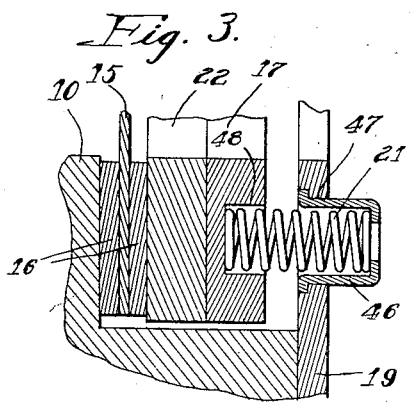

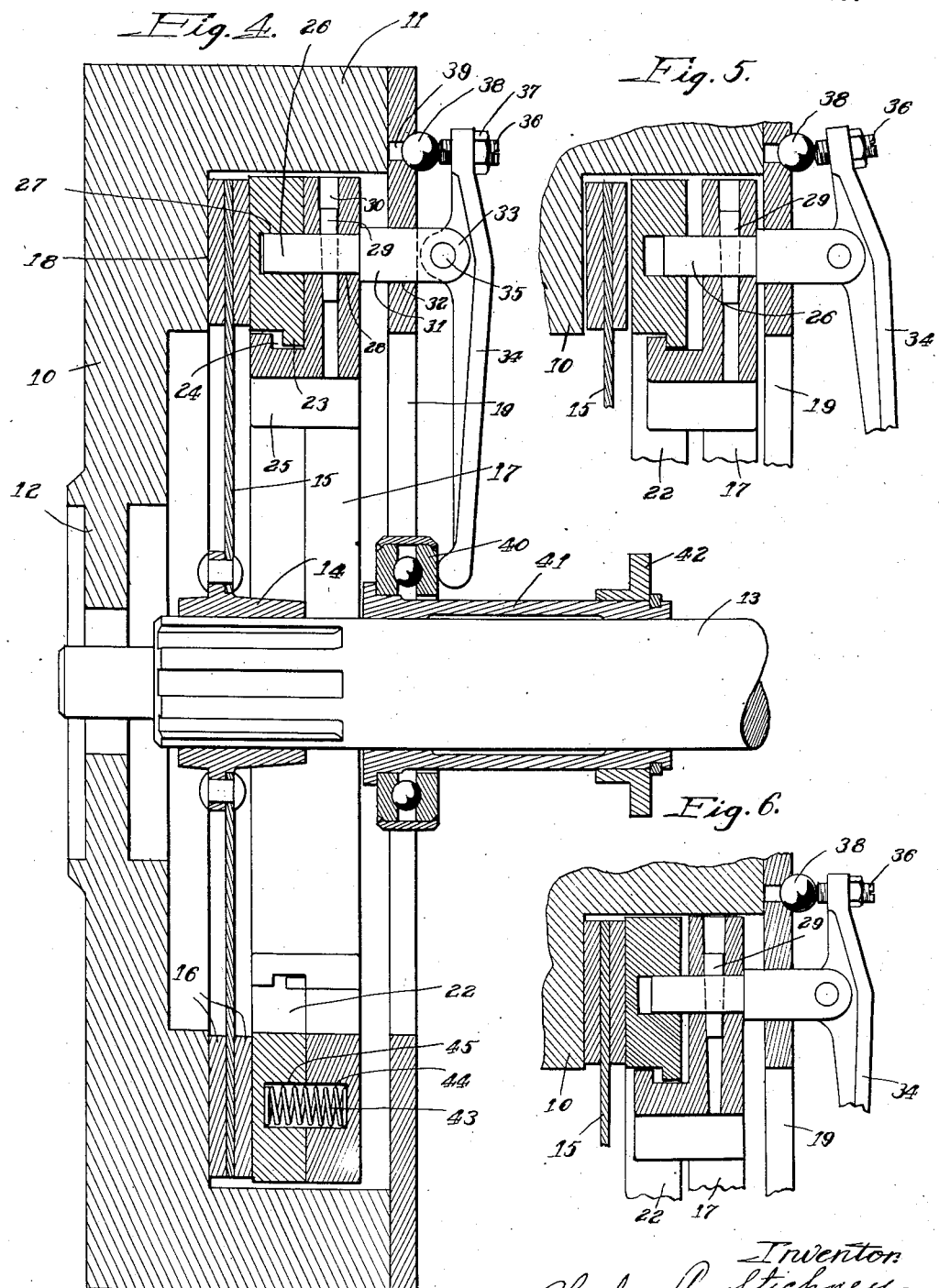

1,645,780

UNITED STATES PATENT OFFICE.

CHARLES A. STICKNEY, OF ROCKFORD, ILLINOIS, ASSIGNOR TO ROCKFORD DRILLING MACHINE COMPANY, OF ROCKFORD, ILLINOIS, A CORPORATION OF ILLINOIS.

FRICTION CLUTCH.

Application filed October 19, 1925. Serial No. 63,205.

This invention relates to a friction clutch of the disc type especially adapted for motor vehicles.

The principal object of the invention is to provide a clutch so constructed as to avoid objectionable grabbing and chattering in operation and to afford smooth and quiet running, by the provision of means for securing engagement of the clutch in two stages; in the first stage the plates being held in engagement under light pressure to permit a certain amount of slippage, and in the second and final stage the plates being held in engagement under heavier pressure which does not permit of any appreciable slippage.

In carrying out the above object I provide a main pressure plate having comparatively heavy springs to bear thereon to hold the driving and driven discs or other members firmly engaged without slippage, and an auxiliary or intermediate pressure plate having comparatively light springs bearing on the same to hold the discs in less secure engagement upon the initial power take-up to permit of a certain amount of slippage, the auxiliary pressure plate being mounted on the main pressure plate to be capable of a certain amount of movement away from the main pressure plate with the light springs acting thereon to engage the auxiliary plate first under the light spring pressure, whereupon, when the main plate is brought into engagement, the heavy springs acting thereon secure the final engagement of the clutch.

Referring now to the drawing illustrating my invention, Fig. 1 is a rear elevation of a fly wheel having my improved clutch mounted thereon;

Figs. 2 and 3 are enlarged fragmentary sectional details taken on the lines 2—2 and 3—3 of Fig. 1;

Fig. 4 is an enlarged central vertical longitudinal section through the clutch and fly wheel, taken on the line 4—4 of Fig. 1, the clutch being shown in fully engaged condition; and Figs. 5 and 6 are fragmentary sectional details to illustrate the completely disengaged and partially engaged conditions of the clutch.

Throughout the views the same reference numerals are applied to corresponding parts, as the parts are referred to in the course of the following description, and the sections are taken looking in the directions indicated by the small arrows.

The clutch of my invention is illustrated enclosed in a fly wheel 10 in the recess usually provided by the rearwardly projecting annular flange 11 thereon. The fly wheel is conventionally mounted on a coupling flange usually provided on the rear end of the crank shaft, there being bolts passing through the coupling flange and the web 12 on the fly wheel. The fly wheel 10 may be regarded as the driving element. A shaft 13 constitutes the driven element and ordinarily extends rearwardly into the gear box of the transmission. A collar 14 is splined on the shaft 13 and supports one or more driven discs 15 having lining members 16 on opposite faces thereof. A ring shaped plate 17 is disposed behind the driven disc 15 and is arranged to hold the same in close frictional engagement with the driving face 18 on the fly wheel 10. It is common practice to provide a back plate 19 secured by bolts 20 or other means to the flange 11 on the fly wheel. A plurality of springs 21 operate between the pressure plate 17 and the back plate to urge the pressure plate 17 normally under considerable pressure to keep the driving and driven elements firmly engaged. This arrangement, however, makes no allowance for the fact that unevennesses arise in the wearing of the linings on the driving and driven elements, and that mechanical imperfections are bound to occur, which will prevent smooth and even power take-up when the clutch is engaged. As a matter of fact it is commonly known that clutches grab and chatter very frequently, despite painstaking adjustment and oftentimes with the linings renewed, where that was considered the cause of the trouble. It is my endeavor to avoid the objections referred to by providing means for gradually placing the driven element in driving relation to the driving element. For this purpose I provide means for engaging the driven element with the driving element by stages; in the first stage of engagement the driving and driven elements are engaged under light spring pressure permitting a certain amount of slippage, and in the second and final stage of engagement the elements are engaged under a comparatively heavy pressure which will permit of no appreciable slippage.

Proceeding now to a more detailed description of my invention, it will be noted that I provide an auxiliary or intermediate pressure plate 22 between the pressure plate 17 and the driven disc 15. This plate is arranged to turn with the plate 17 but is capable of a slight amount of separation therefrom to the extent shown in Fig. 5 and to a lesser extent shown in Fig. 6. This operation is secured by providing a plurality of lugs 23 on the inner periphery of the plate 22 as shown most clearly in Fig. 4. The lugs 23 are received in recesses 24 provided by overlying lugs 25 provided on the plate 17. As shown in Fig. 1, three lugs 25 are provided in evenly spaced relation. The lugs are brought into operative relation by first placing the plates together with the lugs 23 lying between the lugs 25. The plates are then given relative rotation until the lugs 23 lie within the recesses 24. The recesses are sufficiently wide to permit the plate 22 separating from the plate 17 to the extent shown in Fig. 5. The two plates are, however, prevented from relative rotation by a plurality of pins 26. These engage in sockets 27 provided in the plate 22 and are secured in openings 28 provided in the plate 17. Dowel pins 29 are entered in radial openings 30 in the plate 17 to fasten the pins 26 with the enlarged rear ends 31 thereof lying against the rear side of the plate 17 as shown. The rear ends of the pins 26 are slidably received in openings 32 provided in the back plate 19, and are bifurcated, as shown at 33, to receive radially extending levers 34. The latter have pivotal movement with respect to the pins 26 on pins 35, extending through the bifurcated ends 33 of the pins 26. The levers have their outer ends provided with adjustable set screws 36, arranged when properly adjusted to be locked by nuts 37. The screws 36 engage bearing balls 38 set in countersunk openings 39 in the back plate 19. The inner ends of the levers are operated by a thrust bearing 40 provided on the throw-out sleeve 41, which has the usual form of clutch collar 42 to receive the forked end of the clutch lever. From the description thus far, it will be seen that the main pressure plate 17 is arranged to be operated positively by the levers 34 and that the auxiliary pressure plate 22 has, in effect, a lost-motion connection with the plate 17, so far as its movement in and out therewith is concerned for the engagement and disengagement of the clutch.

The plate 22 is normally urged away from the plate 17 in the direction of the driven disc 15 by a plurality of light compression springs 43, received in registering recesses 44 and 45 in the plates 17 and 22 respectively. These springs serve normally to hold the plates 17 and 22 separated to the extent shown in Fig. 5. As a result, when the main pressure plate 17 is given an initial movement toward its engaged position, from the fully disengaged position shown in Fig. 5, the plate 22 engages the driven disc 15 under the pressure of the springs 43. This partially engaged position of the parts is illustrated in Fig. 6. It is not until the plate 17 is given a further movement toward engaged position that the main set of springs 21 comes into operation. This is when the plate 17 comes into full engagement with the plate 22 and forces it under heavy pressure against the disc 15. The springs 43 are comparatively light and, as illustrated in Fig. 1, it is contemplated to provide a relatively small number of these springs compared with the number of springs 21 provided. The springs 21, it will be noted, are set in thimbles 46 received in suitable openings 47 in the back plate 19 and engaged in suitable sockets 48 in the plate 17. Obviously, the initial engagement of the clutch under the light pressure of the springs 43 will permit a certain amount of slippage and there will be a gradual power take-up by the shaft 13 until the comparatively heavy springs 21 come into operation, after which no more appreciable slippage can occur. It is believed obvious from the foregoing that the two sets of springs need not be capable of exerting different loads. Approximately the same results would be secured if the one set served simply for the initial engagement to provide light pressure and the other set served to augment the load for final engagement. An advantage of the arrangement, aside from its utility in preventing chattering and grabbing, is that there is avoided the objectionable spinning of the gears in gear shifting upon disengaging the clutch. This is due to the fact that, as there is a gradual engagement of the clutch, there is likewise a gradual disengagement; the light springs 43 serving in a measure to exert a retarding or checking effect during the disengaging operation. This feature arises from the fact that, as is well known, the car is accelerated with the gears in mesh, and, during the process of shifting from one gear to another, the foot is removed from the accelerator pedal, causing an instantaneous decrease in speed of the engine and consequently of the fly wheel and clutch. The removing of the foot from the accelerator pedal is usually properly timed with the releasing of the clutch by experienced drivers to take advantage of the slowing of the engine to stop the spinning of the gears with the clutch. It is believed that my invention takes more complete advantage of the slowing down of the engine due to the time lag in disengaging resulting from the lost motion relation of the auxiliary pressure plate with the main pressure plate.

While I have described my invention as applied to a particular embodiment it is to be understood that various other structures may be devised securing substantially the same results and, also, the invention must not be regarded as applicable solely to friction clutches or friction clutches of the plate or disc type. The accompanying claims are not therefore to be construed as limiting the invention in any manner to the specific embodiment illustrated.

I claim:

1. In a friction clutch, a driving member, such as a fly wheel, a driven member, a back plate on said fly wheel, a pressure plate between said back plate and said driven member, a main pressure spring between said pressure plate and said back plate for urging said pressure plate toward said driven member, an intermediate pressure plate between said main pressure plate and said driven member, an auxiliary pressure spring acting between said main pressure plate and said intermediate pressure plate serving normally to hold the same separated and to urge said intermediate pressure plate toward said driven member, and means for operating said clutch whereby to engage said intermediate pressure plate first under the sole pressure of the auxiliary spring and afterwards said main pressure plate with said driven member under the combined pressure of both springs.

2. In a friction clutch, a driving member, such as a fly wheel, a driven member, a back plate on said fly wheel, a pressure plate between said back plate and said driven member, comparatively heavy pressure springs between said pressure plate and said back plate for urging said pressure plate toward said driven member, an intermediate pressure plate between said main pressure plate and said driven member, means connecting said pressure plates to permit slight separation thereof but preventing relative rotation therebetween, comparatively light pressure springs acting between said main pressure plate and said intermediate pressure plate serving normally to hold the same separated and to urge said intermediate pressure plate toward said driven member, and means for operating said clutch whereby to engage said intermediate pressure plate first and afterwards said main pressure plate with said driven member.

3. In a friction clutch, a driving member, such as a fly wheel, a driven member, such as a clutch plate, a back plate on said fly wheel, a two part pressure plate between said back plate and said clutch plate, the two parts providing registering recesses therein, a first set of pressure springs seated in said recesses for urging the forward part of said pressure plate away from the rearward part toward the clutch plate, registering recesses in said rearward part and back plate, a second set of pressure springs disposed in said recesses to urge the rearward part forward toward the clutch plate, the springs of the second set being heavier than those of the first set whereby to overcome the resistance thereof when holding the driving and driven members in full engagement under heavy pressure, means interconnecting the two parts of said pressure plate so that the forward part comes into engagement with the driven member first and is removed from engagement last, and means acting between said back plate and said pressure plate for retracting the rearward part against the action of the second set of springs and for moving the forward part with the rearward part or permitting both parts to move toward their engaged positions, said means comprising elements for preventing relative rotation between the forward and rearward parts of said pressure plate or between the pressure plate as a whole and the back plate.

4. A clutch structure as set forth in claim 3 wherein the two parts of the pressure plate have means arranged to be interlocked by relative rotation of the parts in one direction, said interlocking means permitting limited movement of one part relative to the other axially, the means for actuating said pressure plate having a positive connection with the rearward part thereof to allow the same to be advanced or to retract the same, and serving to hold the forward part against relative rotation with respect to the rearward part while permitting the limited relative axial movement referred to.

5. In a clutch structure as set forth in claim 3 wherein the means interconnecting the two parts of the pressure plate comprises lugs on one part and lugs on the other part providing recesses to interlock with the lugs on the first mentioned part when one part is rotated relative to the other to a certain definite position, the said recesses permitting limited axial movement of one part relative to the other, the provision of registering openings in said parts, and pins received in said openings serving to maintain the two parts against relative rotation from their interlocked position.

6. In a clutch structure as set forth in claim 3 wherein the means interconnecting the two parts of the pressure plate comprises lugs on one part and lugs on the other part providing recesses to interlock with the lugs on the first mentioned part when one part is rotated relative to the other part to a certain definite position, the said recesses permitting limited axial movement of one part relative to the other, the provision of registering openings in said parts, and pins received in said openings serving to maintain the two parts against relative rotation from their interlocked position, said pins being received also in openings provided in the back plate whereby to prevent relative rotation between the pressure plate as a whole and the back plate and constituting elements of the said means for actuating the pressure plate.

In witness of the foregoing I affix my signature.

CHARLES A. STICKNEY.